United States Patent [19]
Galbraith

[11] Patent Number: 5,507,191
[45] Date of Patent: Apr. 16, 1996

[54] DYNAMOMETER

[75] Inventor: Peter A. Galbraith, West Midland, Australia

[73] Assignee: Galbraith Engineering Pty. Ltd., West Midland, Australia

[21] Appl. No.: 185,879

[22] PCT Filed: Jul. 27, 1992

[86] PCT No.: PCT/AU92/00390

§ 371 Date: May 23, 1994

§ 102(e) Date: May 23, 1994

[87] PCT Pub. No.: WO93/03342

PCT Pub. Date: Feb. 18, 1993

[30] Foreign Application Priority Data

Jul. 26, 1991 [AU] Australia ................. PK7453

[51] Int. Cl.⁶ ............................................. G01L 08/00
[52] U.S. Cl. ............................................. 73/862.09
[58] Field of Search ................. 73/862.09, 862.17, 73/117, 862.14, 862.193

[56] References Cited

U.S. PATENT DOCUMENTS

| | | | |
|---|---|---|---|
| 2,106,542 | 1/1938 | Winther | 73/862.17 |
| 2,188,398 | 1/1940 | Bernard | 73/862.17 |
| 2,419,837 | 4/1947 | Hugin | 73/862.17 |
| 2,585,475 | 2/1952 | Lee et al. | 73/862.17 |
| 2,672,954 | 3/1954 | Bennett | 188/90 |
| 2,744,409 | 5/1956 | Wintle, Jr. et al. | 73/862.17 |
| 2,973,640 | 3/1961 | Diesfeld | 73/862.17 |
| 3,135,111 | 6/1964 | Roe | 73/862.17 |
| 3,402,599 | 9/1968 | MacMillan | 73/117 |
| 3,486,051 | 12/1969 | Hanson | 73/862.17 |
| 4,092,855 | 6/1978 | Kinney | 73/134 |
| 4,213,332 | 7/1980 | Bonomo et al. | 73/862.14 |
| 4,416,160 | 11/1983 | Sugimoto | 73/862.17 |

FOREIGN PATENT DOCUMENTS

| | | |
|---|---|---|
| 2428611 | 1/1975 | Germany. |
| 5776429 | 5/1982 | Japan. |
| 518863 | 3/1940 | United Kingdom. |
| 711539 | 7/1954 | United Kingdom. |

*Primary Examiner*—Richard Chilcot
*Assistant Examiner*—George M. Dombroske
*Attorney, Agent, or Firm*—Knobbe, Martens, Olson & Bear

[57] ABSTRACT

An absorption dynamometer includes a rotor (12) and restrained stator means (14), and in use of which the rotor energy is substantially dissipated as heat in the stator means. A cooling arrangement (16) for the stator means comprises passage means (62,63) for coolant fluid. This passage means extends, at least in part spirally, from a fluid intake port (70) at or adjacent a first end of the stator means to an oultet outlet port (71) at or adjacent a second end of the stator means. Also disclosed is a vibration absorption means (25) and flexible coupler means (84,85) to dampen the vibrations of a power tool being tested.

14 Claims, 3 Drawing Sheets

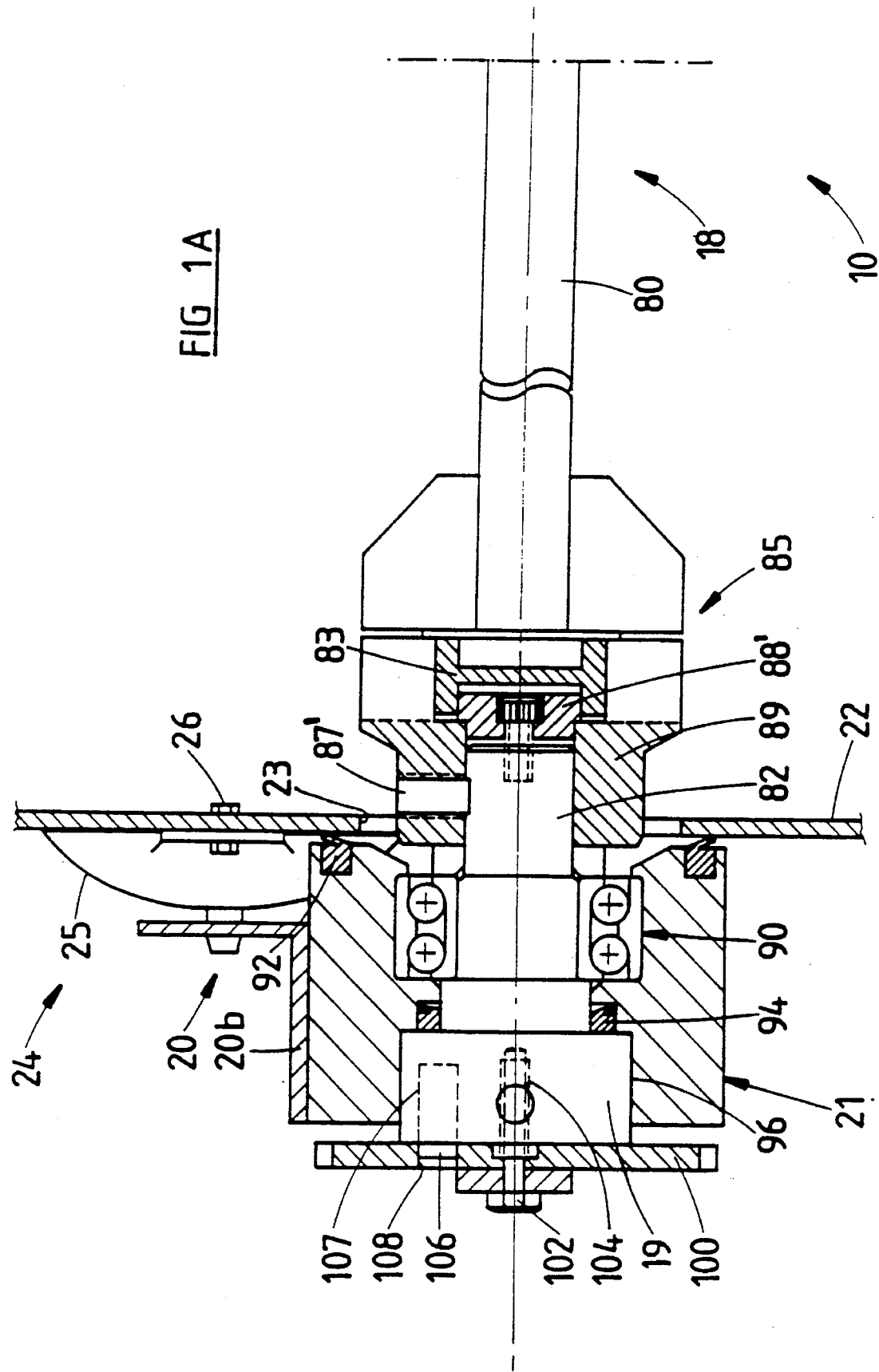

DYNAMOMETER

FIELD OF THE INVENTION

This invention relates to dynamometers of the class known as absorption dynamometers. The invention has particular though by no means exclusive application to drum dynamometers, especially magnetic eddy current drum dynamometers, and it is this application which is primarily discussed in this specification.

BACKGROUND ART

Magnetic eddy current drum dynamometers generally include a longitudinally ribbed rotor and a surrounding stator which is restrained against rotation by means able to measure the torque developed in the stator. The stator typically includes a central field coil and the dynamometer operates as a brake or absorption dynamometer by absorbing energy dissipated into the stator by way of eddy currents induced in the stator as the revolving ribs cyclically modify the magnetic flux. Means is provided to extract the heat from the stator, and in one known arrangement, coolant fluid is continuously supplied to a central annular chamber housing the coil and then extracted through multiple spiral galleries in a pair of stator rings to either side of the chamber. This arrangement has the disadvantages that it is critically dependent for its continued safe operation on the integrity of the seals which prevent the coolant fluid leaking into the coil and that any blockage or significant flow restriction in any one of the spiral galleries can easily lead to a thermal runaway condition before the blockage is realised. The latter occurs because a localised blockage in one gallery (while the dynamometer is under load) immediately causes a localised increase in temperature which can easily and very rapidly cause severe damage to or destruction of key internal components of the dynamometer before performance loss is noticeable.

It is accordinly one objective of the present invention, in one of its aspects, to provide an improved cooling arrangement for absorption dynamometers of the general type under discussion.

An important potential new application for a dynamometer is in the field of testing power tools such as chainsaws. The traditional practice when servicing or repairing chainsaws is to conclude with a direct on-site test on a waste log or the like but there is growing dissatisfaction with the noise and materials waste that this practice entails, and also with the relative inaccuracy inherent in such practice.

The present applicant has constructed an eddy current dynamometer test unit to which a chainsaw drive head may be rigidly mounted but it has been found that the results do no accurately reflect the subsequent working performance of the chainsaw. The applicant has appreciated, in accordance with the second aspect of the invention, that this discrepancy arises because the rigidly fixed disposition of the chainsaw on the dynamometer test unit does not properly reflect the normal hand held condition in which the chainsaw and its drive components are free to vibrate. It is to the resolution of this disconformity that the second aspect of the invention is directed.

DISCLOSURE OF THE INVENTION

The invention accordingly provides, in its first aspect, an absorption dynamometer which includes a rotor and restrained stator means, and in use of which the rotor energy is substantially dissipated as heat in the stator means, a cooling arrangement for the stator means comprising passage means for coolant fluid, said passage means extending, at least in part spirally, from a fluid intake port at or adjacent a first end of the stator means to an outlet port at or adjacent a second end of the stator means.

The invention also provides, in its first aspect, an absorption dynamometer which includes a rotor and restrained stator means, and in use of which the rotor energy is substantially dissipated as heat in the stator means, a cooling arrangement for the stator means comprising passage means for coolant fluid, said passage means including one or more spiral duct segments arranged so that, at least for a major part of the length of the stator means, the flow in the or each spiral duct segment may be separately monitored. The dynamometer may include separate flow monitoring means for the or each spiral duct segment.

The passage means preferably includes one or more portions which all fluid flowing in the passage means must traverse, e.g. respective spiral passage segments in each of respective segments of the stator liner means. These portions of the passage means preferably together cool the major proportion of the axial length of the stator means.

In its first aspect, the invention also provides an absorption dynamometer which includes a rotor and restrained stator means, and in use of which the rotor energy is substantially dissipated as heat in the stator means, a cooling arrangement for the stator means comprising passage means for coolant fluid, said passage means including one or more single passages extending between respective pairs of spaced ports in the stator means and/or in respective axial segments of the stator means.

In its second aspect, the invention provides an absorption dynamometer which includes a rotor and restrained stator means, and in use of which the rotor energy is substantially dissipated as heat in a stator means, means for drivingly coupling said rotor to a power tool to be tested comprising:

a shaft assembly projecting coaxially from said rotor, said shaft assembly including at least one vibration damping flexible coupler means, and means adapted to be irrotationally secured to a rotatable element of said tool;

a mounting assembly rotatably supporting said shaft assembly;

structure adapted to be fixed to or rested upon an external support; and vibration absorption means coupling said mounting assembly to said structure, said shaft and mounting assemblies being able to vibrate with said tool when the rotatable element of the latter is operable, such vibration being substantially dampened by said vibration absorption means and by said flexible coupler means.

In either aspect, the absorption dynamometer is preferably a drum dynamometer and advantageously an eddy current dynamometer in which the stator means is an annular structure disposed about the rotor and carries a field coil for generating a magnetic field in which the rotor rotates, and wherein the rotor has multiple longitudinal ribs which revolve with the rotor in the magnetic field.

In the first aspect of the invention, as applied to such an eddy current dynamometer, the coil is preferably provided in an annular chamber within the stator means and said passage includes spiral segments in respective stator liner segments to either axial side of said chamber. There is preferably a single spiral duct in each liner segment, but there may be plural spiral ducts in each liner segment arranged in relation to the ports thereto so that the flow through each segment may be separately monitored.

Preferably, a central stator liner portion serves as a coil former and has annular recesses at either end open to the passages in said earlier mentioned stator liner segments, and plural longitudinally extending ducts connecting these recesses. The total cross-sectional flow area of these ducts in the coil former is preferably substantially equal to the cross-sectional flow area of the respective spiral passages.

In the coupling means according to the second aspect of the invention, the or each of the vibration damping flexible coupler means advantageously comprises a rubber cross or similar coupler, and there are preferably at least two such coupler means at spaced locations along the shaft assembly. The vibration absorption means may, for example, comprise at least three anti-vibration mountings disposed on respective arms forming part of said mounting assembly.

When it is stated herein that rotor energy is substantially dissipated as heat in the stator means, it is envisaged that the rotor energy is preferably almost entirely so dissipated (eg 99 to 99.5%), only minor fractions being lost for example to bearing friction and noise.

BRIEF DESCRIPTION OF THE DRAWINGS

The invention will now be further described, by way of example only, with reference to the accompanying drawings, in which:

FIG. 1, divided into two overlapping sections designated FIGS. 1A and 1B, is an axial cross-section of an eddy current drum dynamometer assembly in accordance with an embodiment of both aspects of the invention, designed particularly for the testing of chainsaws.

EXEMPLARY EMBODIMENTS

Figure 1B:
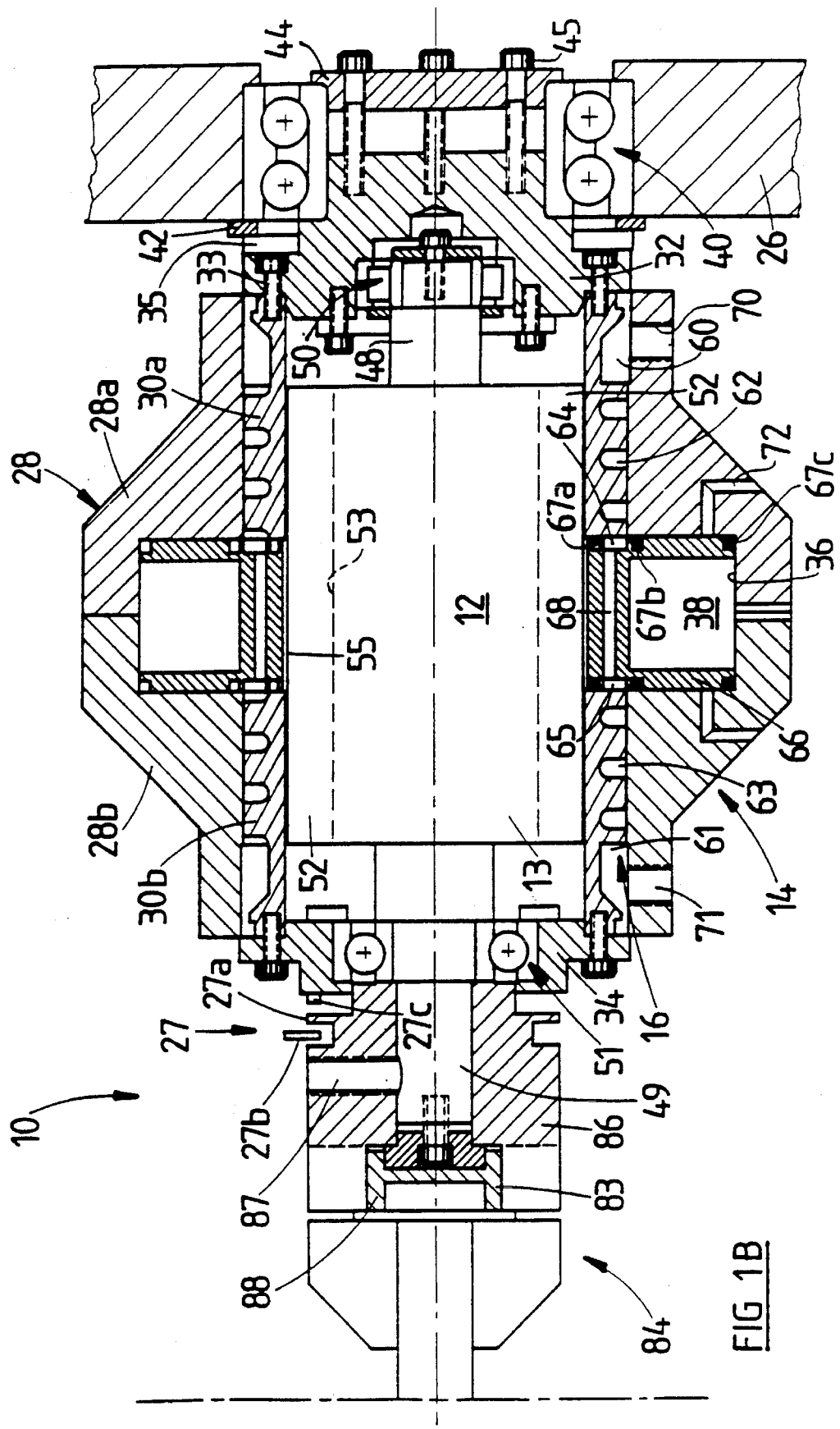

The illustrated eddy current drum dynamometer 10 includes a rotor 12, and a restrained stator assembly 14 which includes a cooling arrangement 16. A shaft assembly 18 projects co-axially from rotor 12 and is rotatably supported adjacent its outer end by a mounting assembly 20. Assembly 20 is in turn supported from the outer front skin 22 of a cabinet (not fully shown) by vibration absorption means generally indicated at 24. Stator assembly 14 is mounted at one end in a pedestal component 26 of the cabinet and the outer end of shaft assembly 18 carries a chuck 19 to which sprocket 100 may be attached and then driven by the chainsaw in a manner to be further described. The cabinet would typically be fixed to or rested upon an external support such as a concrete floor.

Dynamometer 10 is generally of an absorption or brake type in which energy is absorbed from the driven rotor into the body of the stator and conducted away by coolant fluid circulated through cooling arrangement 16. Rotation of the stator assembly 14 is restrained by a radially projecting arm (not shown) fitted with a device to measure the developed torque. A speed measuring device 27 measures the rotational speed of the rotor and shaft assembly, and the brake power may then be calculated in a known manner from the measured torque and rotational speed.

Stator assembly 14 includes a solid annular stator body 28 made of two similar complementary halves 28a, 28b, respective stator liners 30a, 30b which are a shrink or interference fit within each stator half and form the major component of the cooling arrangement 16, and respective end covers 32, 34. The adjacent inner faces of stator body halves 28a, 28b are cut away to mutually define an annular chamber 36 for field coil 38. Rear end cover 32, which is formed as a closure, is secured to the respective stator liner 30a by multiple countersunk screws 33 in recesses 35 and is journalled in pedestal 26 by a double row angular contact trunnion bearing 40. This journalling is completed by an inner thrust ring 42 and an outer thrust plate 44 secured to end cover 32 within the trunnion bearing by multiple bolts 45.

Stator body 28 and liners 30a, 30b are formed in a suitable ferrous based magnetically conductive material with low remanence, e.g. mild steel with low carbon content. End covers 32, 34 are formed in a suitable magnetically non-conductive material, e.g. aluminium or brass.

Rotor 12 has a main central body 13 and stepped integral axles 48, 49 by which the rotor is mounted respectively in a roller bearing 50 in rear end cover 32 and a ball bearing 51 in front end cover 34. The periphery of main rotor body 13 is characterised by an annular array of ribs 52 and grooves 53. The tips 55 of ribs 52 lie close to the inner cylindrical surface of stator liners 30a, 30b but at a sufficient separation to prevent contact and resultant seizure during operation. The braking absorption of energy arises from the cyclic distortion or variation of the magnetic flux by the revolving ribs 52, which in turn generate eddy current heat losses in the stator liners 30a, 30b. The dissipation of this heat is by way of cooling arrangement 16.

As already mentioned, cooling arrangement 16 includes stator liners 30a, 30b. These liners are provided with respective coolant fluid flow passages including an annular intake/exhaust gallery 60, 61 and a single channel 62, 63 provided by a single spiral groove in the outer cylindrical surface of the stator liner. This groove opens at one end into gallery 60, 61 and at the other in the inner annular face of the respective stator liner, and thereby into a respective annular groove 64, 65 in the adjacent end face of a spool shaped central stator liner portion also serving as a former 66 for coil 38. Coil former 66 is a firm fit in chamber 36 and has a trio of O-rings or like annular gaskets 67 in each of its outer end faces respectively disposed to either side of groove 64, 65 and in the corners of chambers 36. The coolant fluid flow path is completed by multiple ducts 68 which extend longitudinally through the body of coil former 66 and so connect grooves 64, 65. Although this is not necessarily evident from the drawing, it is preferred that the total cross-sectional flow area of ducts 68 is substantially equal to the uniform cross-section flow area channels 62, 63.

Intake/exhaust galleries 60, 61 are associated with respective threaded ports 70, 71 in the adjacent stator body halves 28a, 28b by which coolant fluid may be delivered to and extracted from the respective gallery in a pumped flow circuit (not shown). The circuit would typically include a suitable heat exchanger for rejecting extracted heat from the coolant fluid before it is returned to the cooling arrangement 16.

Leakage of coolant fluid into chamber 36 would normally be prevented by the immediately adjacent O-rings 67a, 67b. Leakage into the interior of the coil former 66 and thereby into the field coil must breach a further O-ring 67c in the corner of chamber 36, but to guard against this occurring during operation, any leakage past O-ring 67b would pass to drainage ports 72, which may typically be fitted with moisture detection devices in suitable alarm or cut-off circuits.

It will be appreciated that the particular cooling arrangement involves only a single flow path for the coolant fluid through each of the stator liners. This means that any blockage or restriction to the flow of the coolant fluid can be immediately detected by an appropriate sensor device monitoring flow in the single flow path and connected in a suitable alarm and/or cut-off circuit. There is no danger of overheating or thermal runaway arising from a localised restriction or blockage which is a significant danger with the more complex cooling arrangements found in prior dynamometers of this type.

In an alternative arrangement, there may be plural spiral ducts 62, 63 but galleries 60, 61 are replaced by separate ports 71 for each duct and a separating monitoring device provided for each duct. In a still further arrangement, with multiple spiral ducts 62, 63, there may be no flow through the former and the ducts 62, 63 may be separate from each other, have ports in the central region, and have their respective flows separately monitored.

Turning now to the arrangement by which the dynamometer itself is coupled to the chainsaw, shaft assembly 18 includes a central extending shaft 80 which is coaxially coupled to axle 49 and to an outer journalled shaft 82 by respective rubber-cross flexible couplers 84, 85. A rubber-cross flexible coupler essentially comprises a vibration absorbent rubber core 83 with radially projecting rectangular tabs which separate alternatively interspersed fingers of the two principal annular components of the coupling. In the case of inner coupler 84 the inner of these components 86 is irrotationally fitted to rotor axle 49 by radial screw 87 and screw fastened cap 88. Alternatively, a conventional keyway or spline and locknut arrangement could be used. This component 86 also carries the rotational speed measuring device 27 and to this end includes an integral toothed gate 27a which spins between a light source 27b and an opposed detector 27c.

At the flexible coupler 85, the outer principal component 89 is similarly irrotationally fixed to journalled shaft 82 by screw 87' and just projects through a substantially larger opening 23 in cabinet skin 22. Shaft 82 is journalled in a housing 21, secured to mounting assembly 20, by a double row angular contact bearing 90 behind chuck 19 and this bearing is protected against the somewhat hostile environment created by the adjacent chainsaw by a larger diameter V-ring seal 92 housed in a groove on the inside face of mounting assembly 90 in contact with cabinet skin 22, and by a smaller diameter V-ring seal 94 clamped behind chuck 19 in a stepped bore portion in front of bearing 90. Further protection is provided by a labyrinth seal 96 (not detailed) about the inner corner of chuck 19.

Figure 2:
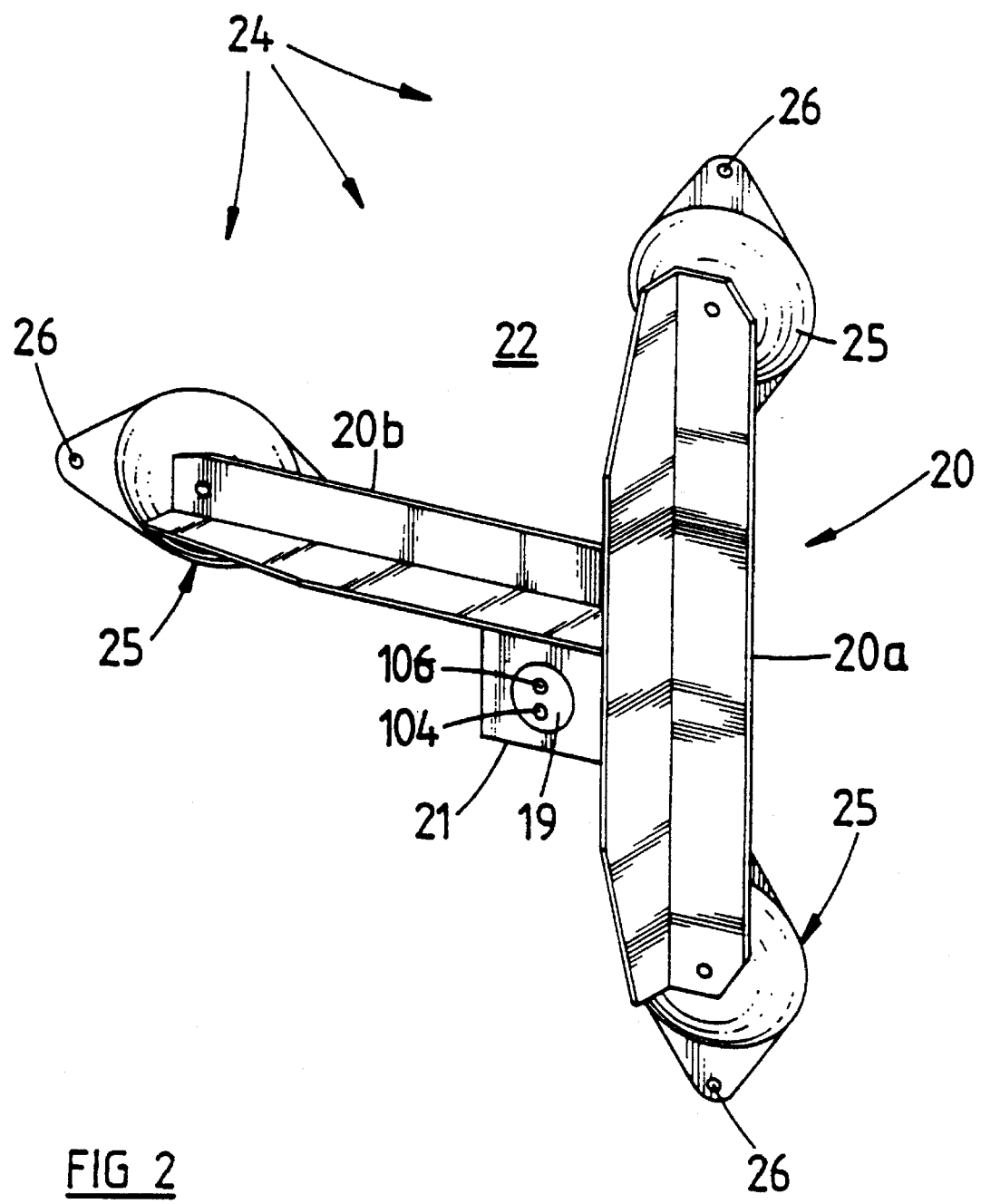
FIG. 2 is an isometric view, from the left of FIG. 1A, showing the mounting assembly outside the cabinet, with the sprocket removed for a better view.

Mounting assembling 20, best seen in FIG. 2, is essentially a T of angle-section bars 20a, 20b, with the head of the T extending vertically and the stem extended to the left as viewed from the front (i.e. into the page as viewed in FIG. 1). Bars 20a, 20b are welded or otherwise fixed to each other and to respective flat side faces of housing 21. The three outer ends of this configuration carry vibration absorption means in the form of suitable anti-vibration mountings 25 by which the outer ends of the bar configuration are affixed at 26 to the external face of cabinet skin 22. These mountings allow journalled shaft 82 to vibrate radially in any direction within opening 23 in cabinet skin 22.

The chainsaw would normally be fitted to the equipment by substituting the normal guide bar and chain with a short dummy guide bar and a short drive chain without cutting teeth. The dummy guide bar is preferably bolted to the mounting assembly 20 at one end and to the usual chainsaw motor mounting pad at the other end. The drive chain drives plate sprocket 100 which is fastened to chuck 19 by a bolt 102 engaged with a threaded coaxial blind bore 104 in the chuck. Irrotational coupling is provided by a cylindrical pin 106 which projects from a matching offset blind bore 107 into a complementary aperture 108 in the sprocket plate 100.

It will be appreciated that, by virtue of the vibration absorption means i.e. the anti-vibration mountings 25, and the rubber-cross flexible couplers 84, 85, the coupling configuration by which the chainsaw motor drives rotor 13 allows the chainsaw to vibrate as it would in actual use. The couplers 84, 85 allow this vibration to be two-dimensional with respect to the shaft assembly. It is believed that a chainsaw tested in this manner provides a dynamometer reading which more accurately reflects the true performance of the chainsaw in use.

I claim:

1. An absorption dynamometer, comprising:
   a rotor rotatable about a longitudinal axis and restrained stator means, in use of which the rotor energy is substantially dissipated as heat in the stator means,
   a cooling arrangement for the stator means comprising passage means for coolant fluid, said passage means extending, at least in part helically with a plurality of revolutions about said axis sufficient to effectively cool the stator means, from a fluid intake port to an outlet port wherein said passage means includes one or more portions which all fluid flowing in the passage means must traverse, which portions of the passage means together effectively cool the major proportion of the axial length of the stator means.

2. An absorption dynamometer according to claim 1, wherein said portions comprise respective helical passage segments in each of respective segments of the stator liner means.

3. An absorption dynamometer according to claim 1 or 2 comprising a drum dynamometer in which the stator means is an annular structure disposed about the rotor and carries a field coil for generating a magnetic field in which the rotor rotates, and wherein the rotor has multiple longitudinal ribs which revolve with the rotor in the magnetic field.

4. An absorption dynamometer according to claim 3 comprising an eddy current drum dynamometer.

5. An absorption dynamometer according to claim 4, wherein said field coil is provided in an annular chamber within the stator means and said passage includes spiral segments in respective stator liner segments to either axial side of said chamber.

6. An absorption dynamometer according to claim 5, wherein there is a single helical duct in each liner segment.

7. An absorption dynamometer according to claim 6, wherein there are plural helical ducts in each liner segment arranged in relation to the ports thereto so that the flow through each segment may be separately monitored.

8. An absorption dynamometer according to claim 5 comprising a central stator liner portion which serves as a coil former and has annular recesses at either end open to the passages in said stator liner segments, and plural longitudinally extending ducts connecting these recesses.

9. An absorption dynamometer according to claim 8, wherein the total cross-sectional flow area of said ducts in the coil former is substantially equal to the cross-sectional flow area of the respective helical passages.

10. An absorption dynamometer according to claim 6 further comprising separate flow monitoring means for the helical duct segment, adapted to signal an alarm condition if flow therein is blocked or restricted.

11. An absorption dynamometer according to claim 1 or 2 further comprising flow monitoring means for said passage means, adapted to signal an alarm condition if flow therein is blocked or restricted.

12. An absorption dynamometer according to claim 1 or 2 further including means for drivingly coupling said rotor to a power tool to be tested comprising:

a shaft assembly projecting coaxially from said rotor, said shaft assembly including at least one vibration damping flexible coupler means, and means adapted to be irrotationally secured to a rotatable element of said tool;

a mounting assembly rotatably supporting said shaft assembly;

structure adapted to be fixed to or rested upon an external support; and vibration absorption means coupling said mounting assembly to said structure, said shaft and mounting assemblies being able to vibrate with said tool when the rotatable element of the latter is operable, such vibration being substantially dampened by said vibration absorption means and by said flexible coupler means.

13. An absorption dynamometer according to claim 12, wherein the or each of the vibration damping flexible coupler means comprises a rubber cross or similar coupler, and there are preferably at least two such coupler means at spaced locations along the shaft assembly.

14. An absorption dynamometer according to claim 12, wherein the vibration absorption means comprises at least three anti-vibration mountings disposed on respective arms forming part of said mounting assembly.

* * * * *

UNITED STATES PATENT AND TRADEMARK OFFICE
CERTIFICATE OF CORRECTION

PATENT NO. : 5,507,191
DATED : April 16, 1996
INVENTOR(S) : Peter A. Galbraith

It is certified that error appears in the above-identified patent and that said Letters Patent is hereby corrected as shown below:

Claim 8, Column 6, line 55 replace "Claim 5 comprising" with --further comprising--.

Signed and Sealed this

Seventh Day of April, 1998

Attest:

BRUCE LEHMAN

*Attesting Officer*     *Commissioner of Patents and Trademarks*